United States Patent [19]

Radice

[11] 4,234,868
[45] Nov. 18, 1980

[54] PERSONAL VERIFICATION DEVICE

[75] Inventor: Peter F. Radice, King of Prussia, Pa.

[73] Assignee: Pennwalt Corporation, Philadelphia, Pa.

[21] Appl. No.: 949,172

[22] Filed: Oct. 6, 1978

[51] Int. Cl.² ............................................. G06K 9/00
[52] U.S. Cl. ............................. 340/146.3 SY; 178/18; 310/311
[58] Field of Search ................ 340/146.3 SY; 178/18, 178/19; 427/83, 100, 123, 126, 445; 310/311, 313; 181/158, 168

[56] References Cited

U.S. PATENT DOCUMENTS 3,684,828  8/1972  Maher ................................... 178/18
3,962,679  6/1976  Engelbrecht ............... 340/146.3 SY Primary Examiner—Leo H. Boudreau

[57] ABSTRACT

A device for verifying personal hand markings, e.g., signatures, and optionally, voice-produced sound, by comparison of electronically produced representations thereof with similar stored information wherein such representations are produced by variations of electrical energy caused by hand markings on a surface adapted to receive said markings and comprising a poled sheet of a piezoelectric-forming resin.

5 Claims, 6 Drawing Figures

PERSONAL VERIFICATION DEVICE

This invention relates to a device for verification of hand markings of an individual and in conjunction therewith, if desired, proximate voice-produced sounds, made by the same individual wherein a transducer associated with the device and adapted to receive said markings and sounds comprises a poled sheet of piezoelectric (or pyroelectric) forming resin, preferably a vinylidene fluoride polymer resin.

Identification of persons is a requirement of many institutions such as stores, banks, laboratories and high security installations. The handwritten signature has long been the most practical and accepted mechanism for identifying individuals. In fact, banks still depend on a visual inspection of an individual's signature in cashing checks. Installations which require security clearances rely primarily on the use of photos on identification badges. Identification is made by a guard prior to entering the premises. In these methods forgery and misrepresentation is possible.

Security systems, are available especially in association with access control, that use "credit card keys." Some of these systems also require a punch in code number. The ultimate in access control is achieved by those devices which use some characteristic of the human body as the "key." For example visual identification through closed circuit television. The capability and reliability of the guard making the identification are the weak points. Identification of other personal characteristics such as voice, finger print and palm print are being developed in access control.

The verification of a person's signature is another method that has receive attention. Some signature verification methods use displacement sensors such as linear differential transformers in a special pen or special writing surfaces which incorporate wire grids. A recently developed signature verification system, which mainly involves the utilization of handwriting acceleration data in a computer, is described in the U.S. Pat. No. 3,983,535, issued Sept. 28, 1976. This patent discloses a writing instrument (pen) provided with a force transducer and covers the discovery and utilization of extremely high correlation components within certain areas of a signature pattern.

It is a principal object of this invention to provide an inexpensive personal verification device wherein a piezoelectric (or pyroelectric) sheet or film is utilized as a transducer to measure the minute variations of pressure and/or temperature with time as an individual writes or hand marks.

Advantages of this invention are as follows: A plastic film having stable piezoelectric (or pyroelectric) properties will allow a large totally active writing surface. A special heated pen can be used if desired to accent the temperature/time effect. The pressure and/or temperature-time information can be displayed for visual examination or transferred into a computer to make appropriate comparisons after the signature is written. The film transducer would also act as a microphone pickup to verify the person's voice as he recites his name or a special code word. This sound information can be processed by the computer thereby supplying an added check of the person's identity. The purpose of verifying both signature and voice is to greatly increase the reliability of the verification system.

DESCRIPTION OF THE PREFERRED EMBODIMENTS

Figure 2A:
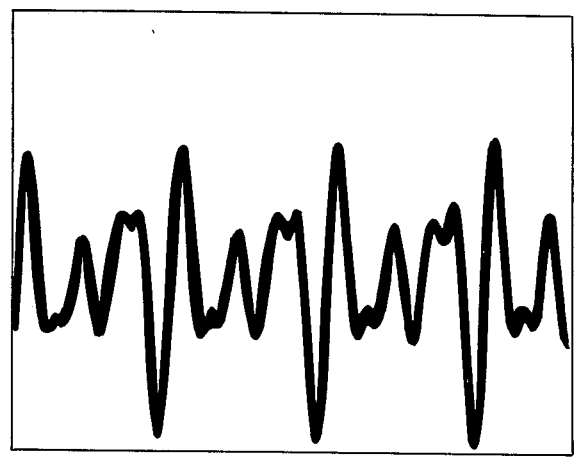
FIGS. 2a and 2b show the output of a piezoelectric film transducer as oscilloscope traces when a voice pattern is produced and then repeated by the same individual.
Figure 2B:
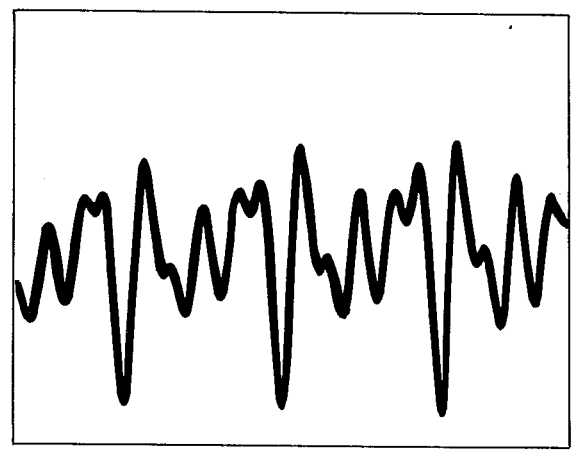
Figure 3:
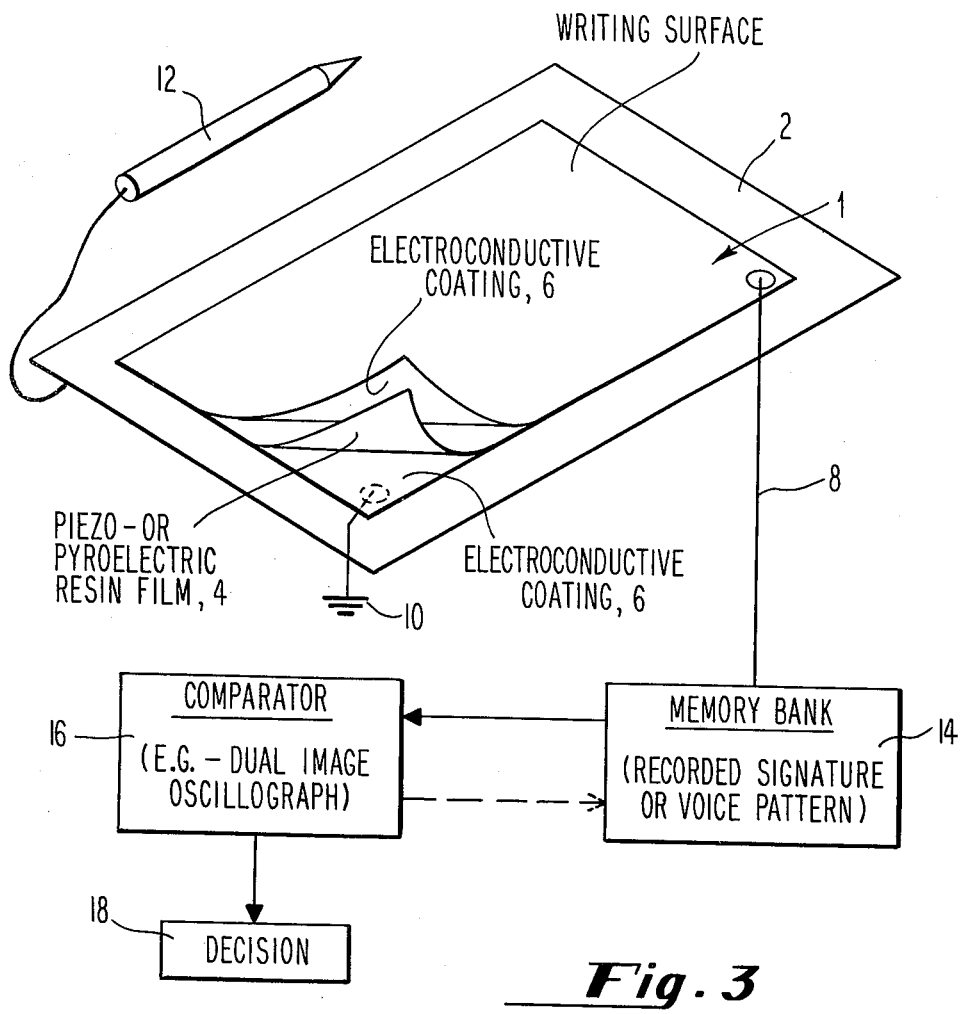
FIG. 3 is a view, partly diagrammatic and partly in perspective, showing the claimed features of the invention.
Figure 4:
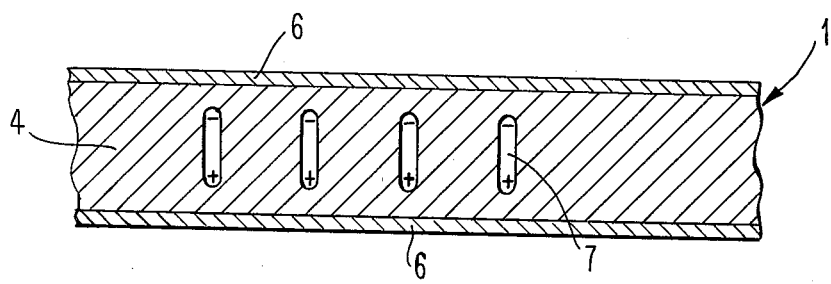
FIG. 4 is a sectional view of a poled sheet of film according to the invention.

As shown in FIG. 3, the verification device 1 is supported at 2 and comprises a poled sheet of a piezoelectric-forming resin. The sheet 4 holds a charge 7 sufficient to provide an electric response when the sheet is marked, as by a pen 12. The sheet 4 may also be sufficiently charged to provide an electrical response from proximate voice-produced sound. The sheet 5 is coated on each side with an electro-conductive coating 6, and equipped with electrode leads 8, 10 on opposite sides thereof, whereby a patterned representation of the signature or voice is transmitted electrically to a means 14 for storing it, also known as a memory bank. In like manner, the patterned representation is transmitted to an oscilloscope 16 or other suitable means for displaying such oscilloscope traces e.g., as in FIGS. 1a, 1b, 2a and 2b. For a decision regarding verification, the display may be visually examined or it may be transferred to a computer 18 which will make comparisons between the stored pattern and the pattern being checked.

The invention herein described is a verification device having a surface adapted to receive hand markings and to transmit a representation of said markings by electrical energy to a means capable of displaying or storing said representation of markings, said device including the improvement wherein said surface comprises a poled sheet of a piezoelectric-forming resin, said poled sheet having a sufficient charge to provide a piezoelectric response when said sheet is hand marked and, optionally, to provide a piezoelectric response from proximate voice-produced sound.

Piezoelectric-forming resins are those resins which are capable of demonstrating a stable piezoelectric (or pyroelectric) effect when films or sheets thereof are poled and the surface charge (homocharge) is dissipated by grounding or other means. Examples of such resins are those disclosed by Kawai in the Japanese Journal of Applied Physics, Volume 8 (1969) 975–976. Kawai discloses poly(vinylidene fluoride), poly(vinyl fluoride), poly(vinyl chloride) and polycarbonate. Certain polyamide resins also demonstrate piezoelectric properties when poled and vinylidene fluoride copolymerized with other halogenated olefins has excellent piezoelectric-forming characteristics; for example, copolymers of 65–75 weight percent vinylidene fluoride with about 35–25 weight percent of either tetrafluoroethylene, trifluoroethylene, hexafluoropropene, vinyl fluoride, vinyl chloride or mixtures of these copolymerizable monomers. In general, polymers of at least 65 mol percent vinylidene fluoride with at least one other copolymerizable monomer, preferably a fluorinated ethylene or propylene, are more useful. As recognized in this art, vinylidene fluoride polymers consisting of all or a high proportion of beta crystals provide the highest piezoelectric properties. Piezoelectric properties in a resin pellicle can be influenced by various treatments and particularly by orientation of the pellicle, either monoaxial, biaxial or multiaxial, brought about by stretching or rolling, as is well known.

Piezo and pyroelectricity is induced in dielectric materials containing permanent electric moments. These moments orient in the direction of the applied electric field. The application of a direct current electric field across the dielectric material is called "poling". The procedure for poling is well known in the art and in the case of dielectric resin films and sheets, generally involves the application of a direct current voltage, e.g., 300 to 1000 kilovolts per centimeter of thickness of dielectric material, to the dielectric resin sheet. The charge is generally applied while heating the resin sheet to a temperature ranging between just above room temperature or just below the melt temperature of the resin for a period of time and then, while maintaining the potential, cooling the resin sheet.

Poling results in permanent polarization and a "heterocharge" due to the net dipole orientation. In addition to this effect, a real charge is injected and concentrated along the film surface. Since this real charge is of the same sign as the poling electrode, it is called a "homocharge". This homocharge can mask the effect of the permanent heterocharge due to the permanent orientation of the dipoles and can produce a false piezoelectricity. The homocharge can remain on a poled dielectric film or sheet for months unless it is removed by some stabilizing technique.

Various techniques for stabilizing poled piezoelectric resin elements and the necessity therefor have been taught in the prior art. In U.S. Patents Nos. 3,660,736 and 3,833,503, a heat process for stabilizing poled films having piezoelectric properties is disclosed. In U.S. Patent No. 3,973,715 a method of stabilizing piezoelectric elements wherein the element is immersed in water, is disclosed. Another excellent method of stabilizing piezoelectric sheets is taught in U.S. Pat. No. 4,055,878 wherein the homocharge is discharged from the poled film by grounding the film held under pressure.

To provide electrodes for conveying electrical responses from the poled sheets, the sheets may be coated on one or both sides before or after poling with electroconductive coatings formed, for example, by vapor deposition, painting, electroplating, sputtering and the like.

Such coatings may be of various conductive materials including, for example, metals or metallic oxides, as are well known in the art. The uncoated sheets may also be laminated with metallic sheets to provide electrodes.

Figure 1A:
FIGS. 1a and 1b of the drawing show oscilloscope traces used to display the output of a piezoelectric film transducer when a signature is written two different times by the same individual.

As previously stated, FIG. 1a of the drawing is a reproduction of a stored oscilloscope trace. It was produced by Peter Radice writing his name on a poled sheet of piezoelectric resin comprising a 0.4 mil thick poly (vinylidene fluoride) film which had been oriented by uniaxial stretching 5 times, coated with a 1000Å thick layer of nickel on both sides, poled by subjecting the coated film to a d.c. voltage of 500 KV/cm. while heating it to 90° C. for 1 hour and cooling for 20 minutes at 40° C., and stabilized by subjecting the poled film to a pressure of about 200 p.s.i. while short circuiting or grounding said film. This poled sheet was then mounted on one-quarter inch thick pressed board after the film was equipped with electrode (aluminum foil) leads on opposite surfaces. The leads were then attached to the input of a Tektronix single beam oscilloscope. A piece of paper was placed over the poled film and the signature was written with a ball point pen.

Figure 1B:
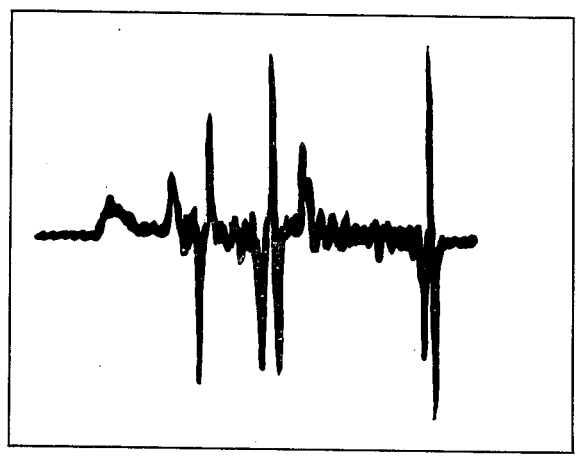

FIG. 1b is reproduction of a second signature written by the same individual on the same poled sheet of a piezoelectric resin and electrically transmitted to the screen of an oscilloscope where it is displayed as a patterned representation of the signature upon the screen.

FIG. 2a is a reproduction of a stored oscilloscope trace representing the output of a poled sheet of piezoelectric resin when a key word was spoken into the surface of the sheet. FIG. 2b is a representation on an oscilloscope screen of the same key word spoken by the same individual at a later time in proximity to the same poled sheet of piezoelectric resin. The piezoelectric resin sheet, in this instance, also acted as a microphone transducer so that verification of an individual's voice could be made along with verification of his signature.

The device, as described herein, can be used in many applications as are described in the art. The specific receiving, storage and comparison means with which the device of this invention can be used in combination or in association are also described in the art and can be seen, for example, in such prior disclosures as U.S. Pat. Nos. 3,840,911; 3,618,019; 3,621,720; 3,699,517 and 3,983,535.

Because of the pyroelectric properties commonly present in poled sheets of piezoelectric resin, a heated stylus can be advantageously employed when marking the sheet thereby accentuating the writing characteristic of the individual whose signature or mark will be verified.

I claim:

1. In a verification device having a surface adapted to receive hand markings and to transmit a representation of said markings by electrical energy for comparison with a similar representation, the improvement wherein said surface comprises a poled sheet of a piezoelectric-forming resin, said poled sheet holding a sufficient charge to provide an electric response when said sheet is hand marked and being coated on each side with an electroconductive coating for transmission of electric responses generated by said hand markings.

2. In the verification device as described in claim 1, said piezoelectric-forming resin being a vinylidene fluoride polymer wherein said polymer is at least 65 mol percent vinylidene fluoride.

3. In the verification device as described in claim 2, said vinylidene fluoride polymer being a homopolymer.

4. In the verification device as described in claim 2, said vinylidene fluoride polymer being a copolymer of at least 65 mol percent vinylidene fluoride with at least one other copolymerizable fluorinated ethylene or propylene monomer.

5. In the verification device as described in claim 2, said poled sheet holding a sufficient charge to provide an electric response from proximate voice-produced sound.

* * * * *